(12) United States Patent
Broadhurst

(10) Patent No.: US 6,419,160 B2
(45) Date of Patent: Jul. 16, 2002

(54) REDUCTION OF NOISE ON CABLE

(75) Inventor: Denzil Broadhurst, Oldham (GB)

(73) Assignee: Pace Micro Technology Plc, Shipley (GB)

( * ) Notice: Subject to any disclaimer, the term of this patent is extended or adjusted under 35 U.S.C. 154(b) by 23 days.

(21) Appl. No.: 09/737,241

(22) Filed: Dec. 14, 2000

(30) Foreign Application Priority Data

Dec. 15, 1999 (GB) .............................................. 9929511

(51) Int. Cl.⁷ .............................................. G06K 19/06

(52) U.S. Cl. .................................. 235/492; 235/472.01

(58) Field of Search ............................. 235/492, 472.01

(56) References Cited

U.S. PATENT DOCUMENTS 5,902,991 A * 5/1999 Kumar ........................ 235/492

* cited by examiner

*Primary Examiner*—Harold I. Pitts
(74) *Attorney, Agent, or Firm*—Head, Johnson and Kachigian

(57) ABSTRACT

Electrical apparatus comprising a number of components or functions is connected to a control system by a ribbon cable. The ribbon cable includes a first line, which carries a signal or data to control the operation of a first component or function, and at least a second line, which carries a signal or data to control the operation of at least a second component or function. An additional signal or data is injected along the first line from the control system which has the effect of reducing the effect of noise from the signal or data passing along the at least second line, on the signal or data passing along the first line.

7 Claims, 1 Drawing Sheet

REDUCTION OF NOISE ON CABLE

CROSS-REFERENCE TO RELATED APPLICATIONS

This application claims priority to GB application Ser. No. 9929511.5 filed Dec. 15, 1999.

BACKGROUND OF THE INVENTION

The invention which is the subject of this application is aimed at providing a reduction to within acceptable levels of the effect of "noise" from a signal which passes along at least one line of a ribbon cable, on the operation of another component connected by the ribbon cable and which is connected by another line on said cable.

One typical use of ribbon cables is in a receiver for broadcast data and which receiver allows the received data to be decoded, processed and video, audio and/or auxiliary data generated. Although this application describes this type of apparatus in more detail it should be appreciated that the invention can be used in many other forms of electrical apparatus where a ribbon cable is used to connect components and the application should be interpreted as covering the use in this other apparatus also.

A ribbon cable comprises a number of connecting lines or tracks which are connected in parallel and one common use is to interconnect components such as, for example a card reader device to a control circuitry which is typically provided on a printed circuit board in the apparatus. An advantage of ribbon cable is that it can be used to control and connect to a number of different components via the lines of the cable. In a number of instances noise from a signal passed along one of the connecting lines can impinge on the control of another component controlled by an adjacent line such that the control is adversely affected and causes the component to fail or malfunction. Frequently, parameters are set for the operation of the various components which are connected and therefore it is difficult or not possible to alter the operation of the components themselves to reduce the effect of the noise. Furthermore, there is economic pressure on the manufacturers of these components to make them for as cheap a price as possible which means that in many instances the components are relatively simple and the possibility of adjusting the operation of the components can be extremely limited.

It is known in some instances to attempt to compensate for the effect of the noise on the component at the receiving end of the cable line by informing the receiving component of the form of the signal which was sent along the line on the ribbon cable and compensation can be incorporated in the component to allow a satisfactory reconstruction of the signal based on this information. However if the components are relatively simple in form it is not possible to incorporate this compensation at the receiving end.

SUMMARY OF THE INVENTION

The aim of the present invention is to provide a connection to a component which runs along at least one line of a ribbon cable and to provide the connection in a manner such that the effect of noise from other lines in the cable is reduced and/or compensated to such an extent that the effect of the noise is removed or is within acceptable parameters so as not to adversely affect the operation of the component.

In a first aspect of the invention there is provided electrical apparatus comprising a number of components or functions connected to a control system by a ribbon cable, said ribbon cable including a first line which carries a signal or data to control the operation of a first component or function and at least a second line which carries a signal or data to control the operation of a second component or function, characterised in that an additional signal or data is injected along the first line from the control system which has the effect of reducing the effect of noise from the signal or data passing along the at least second line, on the signal or data passing along the first line.

In one embodiment the component controlled and connected to the first line is a "Smart" card reader and the line allows for the bi-directional movement of data therealong. The second line in one embodiment is a clock line which connects the printed circuit board to the socket of the smart card device. The invention is of particular benefit where the first and second lines are provided adjacent each other on the ribbon cable and without an intervening ground connection as it is in this configuration that the effect of noise from the clock signals sent along the second line has particular effect on the first line.

In this embodiment in order to generate and inject the signal along the first line, a signal is taken from the clock line on the control system provided on a printed circuit board in the apparatus. This clock signal is then passed through an inverter to generate a signal which is 180 degrees out of phase with the original clock signal. In order to inject this out of phase signal along the first line, the signal is passed through a capacitor at the printed circuit board.

Preferably, to allow finer adjustments to the out of phase signal which is injected along the first line, the signal received by the component at the end of the first line is monitored to check the impact of the noise and if the impact is such that the component is operating within required parameters, no further adjustment is made but if the impact of the noise is significant adjustments to any or any combination of the phase, amplitude and/or edge speed of the injected signal can be made.

In order to allow the adjustments to be made to the injected, out of phase signal it is preferred that the length of the ribbon cable, the cable characteristics and hardware operating characteristics are known.

BRIEF DESCRIPTION OF THE DRAWINGS

A specific embodiment of the invention is now described with reference to the accompanying FIG. 1 circuit diagram which illustrates on embodiment of the invention.

DETAILED DESCRIPTION OF THE PREFERRED EMBODIMENT

Figure 1:
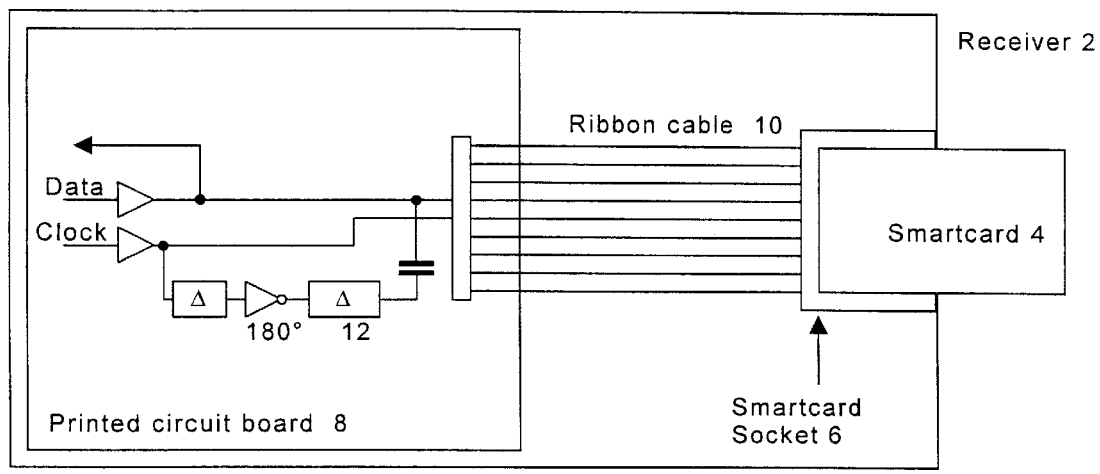

The example shown relates to a receiver 2 for broadcast data and includes a smart card reader 4 which includes a socket 6 into which the user inserts a smart card. If the reader identifies the card then certain or all services provided by the receiver can be accessed by the user. The smart card device is connected to a control system 8 comprising a series of components mounted on a printed circuit board within the apparatus, and is connected via a ribbon cable 10 which has a first line connected to the reader which allows the bi-directional flow of data, and a second line which sends a clock signal and is connected to the socket 6.

In use it is found that the first and second lines are adjacent to each other with no intervening ground connection and it is found that the first line experiences a significant amount of noise from the clock signal which is coupled along the second line and which can cause failure of the data transferred along the first line. In accordance with the invention a signal is taken from the clock line on the control system board and passed through an inverter to generate a signal 12 that is approximately 180 degrees out of phase. This is coupled into the said first line at the transmitting end at the control system 8 through a capacitor. Adjustment of the precise phase, amplitude and edge speed is made whilst the signal received at the smart card reader is monitored, in order to achieve the required level of reduction.

Thus the present invention allows the reduction of coupled noise between adjacent wires in a ribbon cable by the addition of components and injection of an out of phase signal at the transmitter end of the cable.

While the invention has been described with a certain degree of particularly, it is manifest that many changes may be made in the details of contruction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An electrical apparatus comprising: a number of components or functions connected to a control system by a ribbon cable, said ribbon cable including a first line which carries a signal or data to control the operation of a first component or function and at least a second line which carries a signal or data to control the operation of at least a second component or function wherein an additional signal or data is injected along the first line from the control system which has the effect of reducing the effect of noise from the signal or data passing along the at least second line, on the signal or data passing along the first line.

2. An electrical apparatus according to claim 1 wherein the signal from said at least second line is passed through an inverter in said control system to generate the additional signal for injecting along said first line, said additional signal being 180 degrees out of phase from the original second line signal.

3. An electrical apparatus according to claim 2 wherein said additional signal is injected along said first line by passing the signal through a capacitor on a printed circuit board of said control system.

4. An electrical apparatus according to claim 3 wherein said first component connected to said first line is provided with monitoring means to monitor the effect of noise on the line, and if the effect of noise is outside predetermined parameters said additional signal injected along said first line is adjusted for any or any combination of phase, amplitude and/or edge speed.

5. An electrical apparatus according to claim 1 wherein said first and said second lines are adjacent to each other on said ribbon cable and have no intervening ground connection.

6. An electrical apparatus according to claim 1 wherein said first component controlled and connected to said first line is a smart card reader and the line allows for the bidirectional movement of data therealong.

7. An electrical apparatus according to claim 6 wherein said second line is a clock line which connects said control system to a socket of said smart card reader.

* * * * *